Jan. 12, 1960

J. R. COSBY ET AL 2,921,279

BAROMETRIC ALTITUDE RATE CONTROL

Filed May 20, 1954

INVENTORS
James R. Cosby.
Frank O. Watson.
BY
K.G. Doub
ATTORNEY

INVENTORS
James R. Cosby.
Frank O. Watson.
BY K.L.Doub
ATTORNEY

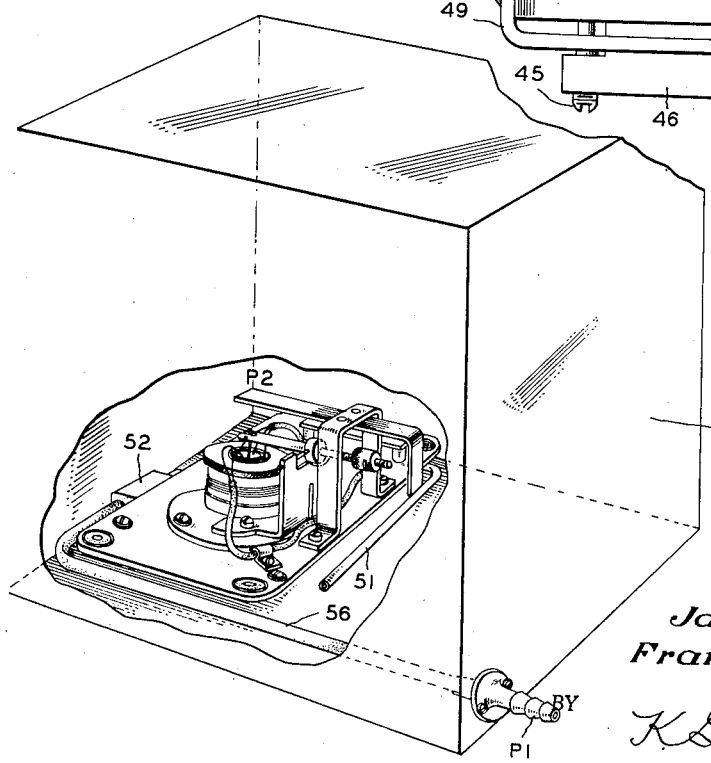

United States Patent Office 2,921,279
Patented Jan. 12, 1960

2,921,279

BAROMETRIC ALTITUDE RATE CONTROL

James R. Cosby and Frank O. Watson, Towson, Md., assignors to Bendix Aviation Corporation, Baltimore, Md., a corporation of Delaware Application May 20, 1954, Serial No. 431,126

2 Claims. (Cl. 336—30)

This invention relates to a control device responsive to changes in altitude, commonly known as a barometric altitude rate control unit. Such units are adapted primarily for producing an electrical signal in response to changes in altitude, which signal is amplified and introduced into the electronic control system of an automatic pilot for an aircraft engine, to control the rate of ascent and/or descent of the aircraft and to provide a damping control while on level flight. Specifications for controls of this type are ofttimes rigid as to weight, simplicity of construction, stability and reliability in operation, while at the same time the unit must resist vibration and have a quick response and accurate signal output; and the primary object of the invention is to provide a device which meets these and other requirements.

The foregoing and other objects and advantages will become apparent in view of the following description taken in conjunction with the drawings, wherein:

Fig. 3 is a view in elevation looking from the right-hand side or edge of Fig. 2;

Fig. 4 is a schematic diagram of the electrical components of the unit; and

Fig. 5 is a broken perspective view of the unit shown mounted in its case or housing.

Figure 1:
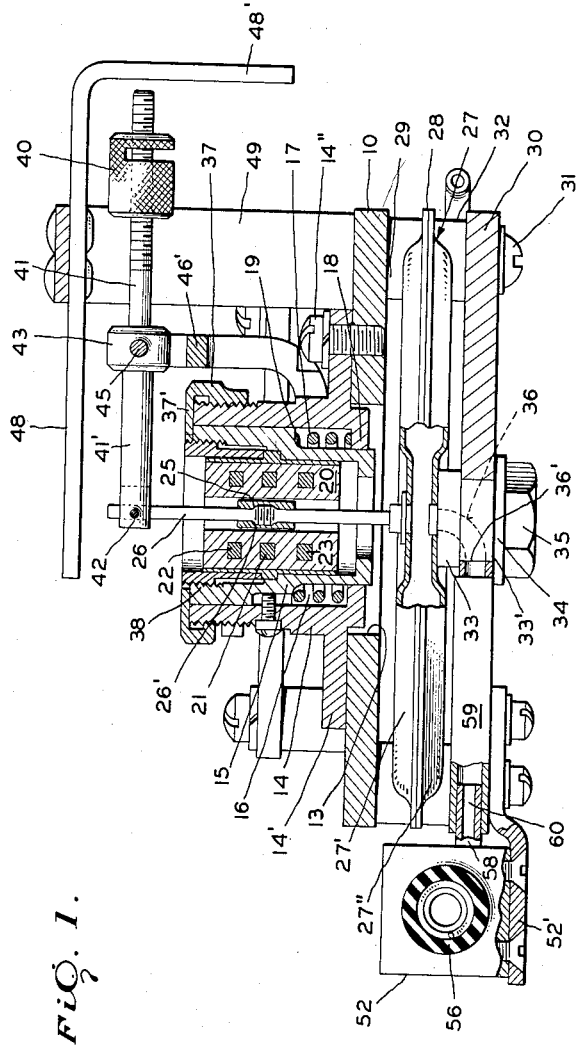
Fig. 1 is a view in transverse vertical section of a barometric rate control unit in accordance with the invention, the unit being shown removed from its case or housing.

Referring to the drawings, a mounting or supporting plate is indicated at 10; it is of generally rectangular shape having at its four corners a series of anchor bolt holts 11 provided with cushioning and centering grommets 12. As shown in Fig. 1, the central portion of the plate 10 is formed with an opening 13, to accommodate a coil assembly holder 14, provided with a base flange 14', which is suitably secured to the base plate 10 by screws 14". Within the holder 14 is inserted a coil bushing 15, having a relieved portion defining a recess 16 for an adjustment spring 17, seated at one end on an inturned flange 18, formed on the adjacent end of the holder 14, and at its opposite end engaging an annulus 19, resulting from formation of the recess 16. Within the bushing is mounted a transformer coil form 20, containing a primary winding 21 and a pair of secondary windings 22 and 23, connected in phase-opposed relation, note Fig. 4. This circuitry will be described in conjunction with the latter figure. Reverting to Fig. 1, an armature 25 is mounted on a stem 26, the latter being provided with an intermediate screw-threaded portion 26' on which the armature 25 is threaded.

A pressure-responsive element 27, preferably in the form of a dual shell diaphragm, comprises coacting dished sections or shells 27' and 27" joined together at their meeting or peripheral edges as at 28, said diaphragm being disposed in a space 29, defined between the base plate 10 and a supplemental base plate 30, the two plates being connected in spaced relation by means of screws 31 and interposed spacers or bushings 32. The diaphragm is fixed to the bottom plate 30 by means of a member having a hex-shaped fitting 33, which is soldered to the central reversely-dished portion of the diaphragm shell 27", and a centering portion 33', projecting through an opening formed in the plate 30 and terminating in a screw-threaded extension adapted to receive a washer 34 and securing nut 35. It will be noted that the only part of the diaphragm which is anchored against movement is the central area of the bottom shell 27", the remaining part of the diaphragm being free to respond to changes in the pressure differential. The upper diaphragm shell 27' is also formed with a complemental reversely-dished central portion, which has soldered thereto the adjacent lower enlarged end of the stem 26. The fitting 33, 33' is formed with a passage 36, shown in dotted lines, and a hollow tube or nipple 36' is connected to the part 33' in communication with said passage, to accommodate the static line for the diaphragm 27.

An adjusting and retainer nut 37 is threaded over an externally-threaded portion of the coil holder 14 and has an inwardly extending flange 37', which engages over the bushing 15; the coil form 20 having an outer supporting jacket or bushing 38, which is adjustably threaded in the upper end of the bushing 15. Since the spring 17 normally urges the bushing 15 carrying the coil form 20 upwardly against the flange 37' of the nut 37, the position of the coil form and hence the coils carried thereby may be adjusted axially by adjusting nut 37.

A stabilizing, balancing and guide weight 40 is adjustably threaded on the outer end of a fulcrum lever in the form of rod 41, having an enlarged portion 41', provided with a forked extremity which is pivoted to the upper end of the armature stem 26 by means of a pin 42. A boss 43 is provided at the point of jointure of the fulcrum rod 41 and its enlargement 41', said boss being transversely drilled to receive a fulcrum pin or shaft 45, which at its opposite ends is journaled in spaced uprights forming part of a bracket 46, split centrally as at 46' and having inturned feet which are anchored to the supporting plate 10 by means of screws 47, see Fig. 2.

A guard or shield protects the top part of the transformer assembly; it consists of a flat strip 48 of metal or other suitable material, having a rear downturned portion 48', said strip being riveted to the top span of an upright supporting bracket 49, having outturned feet which are secured to the base plate 10 by screws 50.

A static pressure vent passage is defined by a metal tube 51 of a predetermined length, having its one end open to the interior of casing C and its opposite end projecting into a fitting or coupling block 52 and secured to the latter by a fitting 53. The block 52 is fixed to a supporting bracket 52' and formed with a passage 54. Projecting axially from an enlarged continuation 54' of passage 54 is a hollow tubular member or nipple 55, on which is pressed the adjacent end of a flexible static pressure tube 56, the opposite end of said tube being adapted for connection to the static line of a velocity measuring and indicating system with which an aircraft is normally equipped. To prevent collapsing of the flexible tube 56 due to bending, an interior spirally-wound wire 57 is provided. Projecting laterally from the passage 54' in block 52 is a tubular fitting or nipple 58, which is coupled to the tubular fitting or nipple 36', heretofore described, by means of a flexible coupling 59, the nipple 58, coupling 59 and nipple 36' communicating passage 54' with the interior of the cell or diaphragm 27 by way of a passage 60. Thus the interior of the diaphragm 27 has an intake from static pressure by means of passage 36, fitting 36', flexible coupling 59, fitting 58 communicating with the passage 54, and flexible conduit 56, and a fixed vent to the interior of casing C by way of orifice 51'. The tube 51 tends to reduce turbulence of the air in the region of the orifice and permits selection of a curve characteristic plotting pressure drop across the orifice against rate of change in altitude by utilizing varying lengths of tubes, since the drop is not only affected by orifice area but also by frictional resistance to flow and hence tube length.

Figure 2:
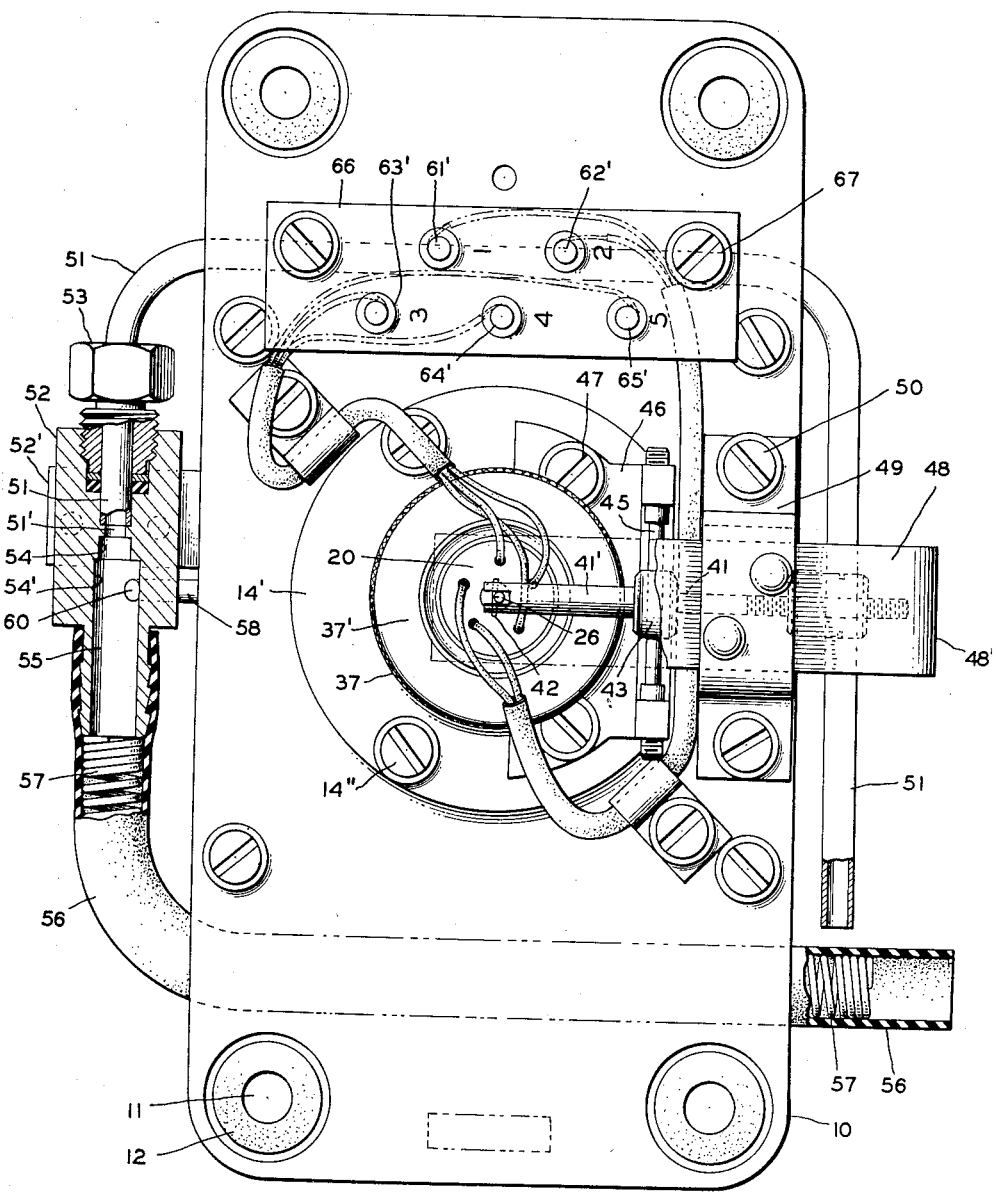
Fig. 2 is a top plan view of said unit with parts broken away.

Fig. 2 taken in conjunction with Fig. 4 relates the transformer coils of the device to the circuit diagram. Leads 61 and 62 are brought out from the primary 21 and are secured to terminals 61' and 62' of terminal block 66, which is anchored to the base plate 10 by means of screws 67 and spacers 68. The leads from the secondaries 22 and 23 are indicated at 63, 64 and 65, and these are brought out and secured to terminals 63', 64' and 65' also carried by the terminal block 66.

Operation

The secondary coils 22 and 23 of the transformer 20 are arranged in phase opposition and the leads from these coils may extend to a suitable amplifier, which amplifies the signal voltage across the secondary coils and communicates it to a suitable driving unit, such as a reversible motor for an automatic pilot for an aircraft, not shown. Ordinarily, there would be one rate control unit for governing rate of climb and descent, another to serve as a damper to dampen sudden vertical rate changes while on level flight, and other units for performing other functions, all feeding into a common magnetic amplifier for an automatic pilot.

The input leads 61 and 62 to the primary 21 may connect with a convenient source of pulsating or alternating voltage, the lead 61 preferably having a choke coil 69 therein in series with the primary 21, of a value such as to establish the proper phase angle between the voltage across the primary and the supply voltage; and it also may function as a filter of harmonics and to avoid changes in flow of current in the circuit with changes in line voltage. Movement of the armature 25 from a null position in an axial direction will impose a voltage of a given polarity and of progressively increasing potential on the output circuit of the secondaries 22 and 23, depending upon the degree and direction of such movement. Thus, should the armature move upwardly from its null position, the signal voltage developed across coil 22 will increase in a positive direction as the coils 21 and 22 become more closely coupled by the armature, the reverse taking place in the coil 23 as the armature moves downwardly from a null position. This action will produce rotation of a reversible servo motor in a given direction and at a constantly increasing speed in response to movement of the diaphragm 27. As will be obvious, the diaphragm 27 will return the armature 25 to a null position when the aircraft levels off at a given altitude, or when the air density to which the diaphragm may be subjected is at a substantially constant value.

Upon a gain in altitude, or decrease in air density, there will be a decrease in static tube pressure and a proportionate increase in the pressure difference across orifice 51' acting in a direction tending to collapse the walls of the diaphragm 27; and upon a decrease in altitude or an increase in air density, static tube pressure will increase, producing a proportionate increase in pressure difference across orifice 51' acting in a direction tending to expand the walls of said diaphragm. In other words, upon an increase or decrease in altitude, a differential is established across the orifice 51' which will vary at a rate proportional to the rate of change in altitude (or change in air density). Since the upper shell of the diaphragm will be displaced by an amount proportional to such differential, and since the differential is also a function of the effective area of the orifice 51', the effective position of the armature 25 at a given altitude may be predetermined by varying the effective area of said orifice. Also, the initial response of the diaphragm for a given rate of change in altitude may be varied by varying the effective length of the tube 51, since the intake or exhaust by way of said tube is affected by the frictional resistance to flow interposed by the tube, and empirical tests show that the initial configuration of a curve plotting pressure difference across orifice 51' against rate of change of static tube pressure can be rendered more or less linear by varying the effective length of the tube.

For one example of operation, let it be assumed that the altitude rate control unit is mounted on an aircraft and operatively connected to an automatic pilot servo motor to damp out sudden changes in flight level. Should the aircraft tend to climb from a preset course, the air density would decrease and the diaphragm 27 would immediately tend to collapse, resulting in movement of the armature 25 downwardly, whereupon the control circuit deriving its input voltage from the coil 22 would energize the automatic pilot servo motor which in turn would move the aircraft elevator controls in a direction to oppose a gain in altitude; a sudden loss in altitude of the aircraft having the opposite effect.

The weight 40 connecting with the armature stem 26 through fulcrum lever 41 not only acts to guide said stem and steady the same in its axial movement, but it also counterbalances the weight of the stem 26 and armature slug 25 and thus eliminates the variable loading action of this mass (stem 26 and slug 25) on the diaphragm shell 27' which would otherwise be present upon a change in position or attitude of the unit. These shells are extremely thin and sensitive, and if the stem and slug were not counterbalanced, should the unit be subjected to a change in position or attitude, the armature would become displaced and erroneous signals would result. Since the moment of the stem 26 acts counter to the moment of the weight 40 at any position of the unit, this counterbalancing action will be effective regardless of the attitude of the aircraft in which the unit is mounted.

Electrical and mechanical zero adjustment (proper location of transformer 20 with associated parts at null position) is facilitated by the assembly including coil holder 14, coil bushing 15, nut 37 and spring 17.

It will be understood that certain limited changes in construction and design of the improved rate control device as illustrated and described herein may be made, to adapt the same to different installations, within the scope of the invention as defined by the appended claims.

What is claimed and desired to be secured by United States Letters Patent is:

1. In a device for generating an electrical signal as a function of the rate of change of altitude, a frame, an element responsive to changes in barometric pressure comprising a pair of dished diaphragm shells connected at their outer edges and defining a chamber therebetween, one of said shells being anchored to said frame and the other shell being free to move in response to changes in barometric pressure, a transformer comprising a primary and a pair of secondaries arranged in phase-opposed relation, a stem having its one end connected to said movable shell and its opposite end projecting through and beyond the core of said transformer, an armature mounted on said stem and movable axially of the transformer to vary the coupling effect between the primary and secondaries, means venting said chamber in a manner such as to cause said armature to move to a null position with respect to said transformer coils at a stable condition of barometric pressure, and a counterbalancing weight for guiding and steadying the stem and armature during axial movement of the latter and for cancelling out variable loading effects of the armature and stem on said movable wall, said weight being mounted on the free end of a lever fulcrumed at an intermediate point and having its opposite end connected to the end of said stem which projects beyond the core of said transformer.

2. In a device for generating an electrical signal as a function of the rate of change of altitude, a base plate, an element responsive to changes in barometric pressure comprising a pair of dished diaphragm shells connected at their outer edges and defining a chamber therebetween, one of said shells being anchored to said plate and the other shell being free to move in response to changes in ambient air density, a transformer comprising a primary and a pair of secondaries arranged in phase-opposed relation, a stem having its one end connected to said movable shell, an armature mounted on said stem and movable axially of the transformer to vary the coupling effect between the primary and secondaries, and means venting said chamber in a manner such as to cause said armature to move to a null position with respect to said transformer coils at a stable condition of barometric pressure; said venting means comprising a coupling block mounted adjacent said element and formed with a passage in communication with said chamber, a substantially rigid tube having one end connected to said block and communicating with said passage through a restricted orifice and its opposite end vented to a reference pressure, and a static pressure tube also having one end connected to said block in substantially unrestricted communication with said passage and its opposite end adapted to communicate wih a source of static pressure.

References Cited in the file of this patent

UNITED STATES PATENTS

| | | |
|---|---|---|
| Re. 20,263 | Urfer | Feb. 9, 1937 |
| 2,251,954 | Rafferty | Aug. 12, 1941 |
| 2,347,134 | Sidwell | Apr. 18, 1944 |
| 2,361,790 | Noxon | Oct. 31, 1944 |
| 2,564,221 | Hornfeck | Aug. 14, 1951 |
| 2,605,695 | Campbell | Aug. 5, 1952 |
| 2,614,244 | Moss | Oct. 14, 1952 |
| 2,640,971 | MacGeorge | June 2, 1953 |
| 2,657,350 | Rossire | Oct. 27, 1953 |
| 2,814,312 | Booth | Nov. 26, 1957 |